United States Patent
Tanaka et al.

(10) Patent No.: US 11,772,370 B2
(45) Date of Patent: Oct. 3, 2023

(54) LAMINATED BODY, METHOD OF PRODUCING METAL MEMBER, AND METHOD OF PRODUCING RESIN MEMBER

(71) Applicant: TEIJIN LIMITED, Osaka (JP)

(72) Inventors: Yoshitaka Tanaka, Gifu (JP); Koji Kubo, Osaka (JP)

(73) Assignee: TEIJIN LIMITED, Osaka (JP)

( * ) Notice: Subject to any disclaimer, the term of this patent is extended or adjusted under 35 U.S.C. 154(b) by 209 days.

(21) Appl. No.: 17/437,334

(22) PCT Filed: Mar. 4, 2020

(86) PCT No.: PCT/JP2020/009185
§ 371 (c)(1),
(2) Date: Sep. 8, 2021

(87) PCT Pub. No.: WO2020/184334
PCT Pub. Date: Sep. 17, 2020

(65) Prior Publication Data
US 2022/0143958 A1    May 12, 2022

(30) Foreign Application Priority Data
Mar. 8, 2019 (JP) ................................. 2019-043172

(51) Int. Cl.
| | |
|---|---|
| *B32B 27/08* | (2006.01) |
| *B29C 45/14* | (2006.01) |
| *B29C 51/10* | (2006.01) |
| *B29C 51/14* | (2006.01) |
| *B29C 65/44* | (2006.01) |
| *B29C 65/00* | (2006.01) |
| *B32B 7/12* | (2006.01) |
| *B32B 27/20* | (2006.01) |
| *B32B 27/30* | (2006.01) |
| *B32B 27/36* | (2006.01) |

(52) U.S. Cl.
CPC ........ *B32B 27/08* (2013.01); *B29C 45/14811* (2013.01); *B29C 51/10* (2013.01); *B29C 51/14* (2013.01); *B29C 65/44* (2013.01); *B29C 66/723* (2013.01); *B29C 66/7392* (2013.01); *B29C 66/7394* (2013.01); *B29C 66/74283* (2013.01); *B32B 7/12* (2013.01); *B32B 27/20* (2013.01); *B32B 27/302* (2013.01); *B32B 27/308* (2013.01); *B32B 27/36* (2013.01); *B32B 2250/24* (2013.01); *B32B 2255/10* (2013.01); *B32B 2255/205* (2013.01); *B32B 2255/26* (2013.01); *B32B 2264/1021* (2020.08); *B32B 2307/402* (2013.01); *B32B 2307/406* (2013.01); *B32B 2307/518* (2013.01); *B32B 2307/538* (2013.01); *B32B 2307/584* (2013.01); *B32B 2307/714* (2013.01); *B32B 2307/732* (2013.01)

(58) Field of Classification Search
CPC ..... B32B 27/08; B32B 27/302; B32B 27/308; B32B 27/36
See application file for complete search history.

(56) References Cited

U.S. PATENT DOCUMENTS

| | | | |
|---|---|---|---|
| 2004/0005436 A1 | 1/2004 | Mori et al. | |
| 2008/0199705 A1 | 8/2008 | Mochizuki | |
| 2010/0196655 A1 | 8/2010 | Kai et al. | |
| 2011/0274894 A1* | 11/2011 | Shi .................. | B32B 27/34 |
| | | | 101/483 |
| 2019/0077134 A1 | 3/2019 | Konno et al. | |
| 2019/0217587 A1 | 7/2019 | Sawamoto et al. | |
| 2021/0187868 A1 | 6/2021 | Tanaka | |

FOREIGN PATENT DOCUMENTS

| | | |
|---|---|---|
| JP | 2001-145981 | 5/2001 |
| JP | 2006-205668 | 8/2006 |
| JP | 2008-274244 | 11/2008 |
| JP | 2014-205275 | 10/2014 |
| JP | 5958610 | 8/2016 |

OTHER PUBLICATIONS

International Search Report dated Jun. 2, 2020 in International (PCT) Application No. PCT/JP2020/009185.

* cited by examiner

*Primary Examiner* — Zachary M Davis
(74) *Attorney, Agent, or Firm* — Wenderoth, Lind & Ponack, L.L.P.

(57) ABSTRACT

A laminated body in which a thermoplastic resin layer, a thermosetting resin layer, and a protective film are layered one on another in this order, in which the thermosetting resin layer contains a thermosetting resin composition containing two or more kinds of organometallic complex, a surface of the protective film at an opposite side of the thermosetting resin layer has a surface roughness Ra of 30 nm or less, and an amount of nitrogen atoms present at the surface of the protective film at the side of the thermosetting resin layer is less than 1 atm %.

10 Claims, No Drawings

LAMINATED BODY, METHOD OF PRODUCING METAL MEMBER, AND METHOD OF PRODUCING RESIN MEMBER

TECHNICAL FIELD

The present invention relates to a laminated body, a method of producing a metal member, and a method of producing a resin member.

BACKGROUND ART

Conventionally, spray coating has been commonly used in order to improve designability of exterior parts and the like of vehicles (for example, a resin molded article such as a fender, a bumper, a bonnet, or a wheel cap). However, in recent years, in a coating step including such spray coating, large facilities and space are required for repeatedly performing coating and drying, and productivity is reduced. Therefore, for the purpose of streamlining the coating step, for example, a method of improving the appearance of a product by pasting a decorative film (hereinafter, the film may also be referred to as a "coating substitute film") to the surface of an exterior component has been studied as a molded member.

As a method of molding such a decorative molded article, for example, an insert molding method in which a decorative sheet is molded into a three-dimensional shape in advance by a vacuum molding mold, the molded sheet is inserted into an injection molding mold, and a fluidized resin is injected into a mold to integrate the resin and the molded sheet, an injection molding simultaneous decorating method in which a decorative sheet inserted into a mold in injection molding is integrated with a molten resin injected into a cavity to decorate the surface of a resin molded body, and the like are known.

A photocurable resin by UV curing has been studied in order to cure a film after the decorative molding to impart durability such as weather resistance and scratch resistance (see Patent Literature 1, for example).

In addition, as a coating material that has good adhesion to a base material, scratch resistance and coated surface appearance, and excellent weather resistance, for example, a coating composition containing (2) from 0.01 to 10 parts by weight of an organometallic compound and (3) from 0.1 to 10 parts by weight of a silicon compound having a silanol group with respect to (1) 100 parts by weight of an epoxy group-containing polyester-modified vinyl polymer (D) obtained by copolymerizing a vinyl monomer containing an alicyclic epoxy group (A) and a vinyl monomer containing a polyester in a side chain (B) is disclosed as a thermosetting resin (see Patent Literature 2, for example).

Citations List

PATENT LITERATURE

Patent Literature 1: Japanese Patent Application Laid-Open (JP-A) No. 2008-274244
Patent Literature 2: JP-A No, 2008-189712

SUMMARY OF INVENTION

Technical Problem

In the photocurable resin described in Patent Literature 1, because UV curing is based on a UV photochemical reaction in mechanism, durability is poor in that a deterioration mechanism of the resin is inherent, and therefore use of a thermosetting resin is desired instead of the photocurable resin.

As a result of studies by the inventors, it has been found that when the resin composition described in Patent Literature 1 or Patent Literature 2 is used as a laminated body, excellent image clearness cannot be obtained in a molded article obtained after integrally molding the molded body and a molded member unless a specific composition of a thermosetting resin layer and a protective film are used.

The present invention has been made in view of the above. An object of the invention is to provide a laminated body having excellent image clearness of an integrally molded product of the laminated body and a molded member, a method of producing a metal member, and a method of producing a resin member.

Solution to Problem

That is, the solution to the above problem includes the following embodiments.

<1> A laminated body in which a thermoplastic resin layer, a thermosetting resin layer, and a protective film are layered one on another in this order, wherein:
the thermosetting resin layer contains two or more kinds of organometallic complex,
a surface of the protective film at a side contacting the thermosetting resin layer has a surface roughness Ra of 30 nm or less, and
an amount of nitrogen atoms present at the surface of the protective film at the side of the thermosetting resin layer is less than 1 atm %.

<2> The laminated body according to <1>, wherein the two or more kinds of organometallic complex include an acetylacetone complex and a benzylacetone complex.

<3> The laminated body according to <1> or <2>, wherein at least one metal of the two or more kinds of organometallic complex is boron.

<4> The laminate body according to any one of <1> to <3>, wherein the thermosetting resin layer contains two kinds of organometallic complex.

<5> The laminated body according to any one of <1> to <4>, further comprising a colored layer between the thermoplastic resin layer and the thermosetting resin layer.

<6> The laminated body according to <5>, wherein the colored layer contains a colored material in which an amount of nitrogen atoms is 1 atm % or less.

<7> The laminated body according to any one of <1> to <6>, wherein the protective film has a tan δ peak temperature of 70° C. or more.

<8> A method of producing a metal member, the method including subjecting the laminated body according to any one of <1> to <7> and a heated steel plate to thermocompression bonding and press molding; and curing the thermosetting resin layer.

<9> A method of producing a resin member, the method including: inserting the laminated body according to any one of <1> to <7> into a mold;
after inserting the laminated body into the mold, injection molding a resin in a molten state to perform in-mold molding; and
curing the thermosetting resin layer during a period of time from after the insertion to completion of the in-mold molding.

<10> A method of producing a resin member, the method including: vacuum heat molding the laminated body according to any one of <1> to <7>; and curing the thermosetting resin layer during a period of time from before the vacuum heat molding to completion of the vacuum heat molding.

Advantageous Effects of Invention

Provided are a laminated body having excellent image clearness of an integrally molded product of the laminated body and a molded member, a method of producing a metal member, and a method of producing a resin member.

DESCRIPTION OF EMBODIMENTS

Hereinafter, the contents of the invention will be described in detail. The description of the components described below may be made based on a representative embodiment of the invention. The invention is not limited to such an embodiment.

In the present specification, "to" indicating a numerical range is used to mean that numerical values described before and after "to" are included as a lower limit value and an upper limit value.

In addition, in a notation of a group (atomic group) in the specification, the notation not indicating substitution or no substitution includes those having a substituent as well as those not having a substituent. For example, "alkyl group" includes not only an alkyl group having no substituent (unsubstituted alkyl group) but also an alkyl group having a substituent (substituted alkyl group).

In the specification, "(meth)acryl" is a word used as a concept including both acryl and methacryl, and "(meth)acryloyl" is a word used as a concept including both acryloyl and methacryloyl.

In addition, the term "step" in the specification includes not only an independent step but also a step that cannot be clearly distinguished from other steps as long as the intended purpose of the step is achieved. In the invention, "% by mass" and "% by weight" have the same meaning, and "parts", "parts by mass" and "parts by weight" have the same meaning.

In the invention, unless otherwise specified, each component in a composition or each structural unit in a polymer may be contained singly or in combination of two or more kinds thereof.

In the invention, the amount of each component in a composition or the amount of each structural unit in a polymer means the total amount of a plurality of corresponding substances present in the composition or the total amount of a plurality of corresponding structural units present in the polymer unless otherwise specified when a plurality of substances or structural units corresponding to each component in the composition or each structural unit in the polymer is present.

In the invention, a combination of two or more preferred embodiments is a more preferred embodiment.

Hereinafter, a laminated body, a method of producing a metal member, and a method of producing a resin member according to the invention will be described.

(Laminated Body)

A laminated body according to the present invention (hereinafter, it is also simply referred to as a "laminated body") is a laminated body in which a thermoplastic resin layer, a thermosetting resin layer, and a protective film are layered one on another in this order, in which the thermosetting resin layer contains two or more kinds of organometallic complex, a surface of the protective film at a side contacting the thermosetting resin layer has a surface roughness Ra of 30 nm or less, and an amount of nitrogen atoms present at the surface of the protective film at the side of the thermosetting resin layer is less than 1 atm %.

In the specification, atm % means atomic percentage.

As a result of intensive studies by the inventors of the invention, it has been found that when the laminated body according to the invention has the above configuration, a laminated body having excellent image clearness of an integrally molded product of the laminated body and a molded member is obtained.

In the specification, excellent "image clearness" means that the disturbance of incident light is small, and image clearness is excellent enough to easily perceive incident light as reflected light as it is. In general, the higher the value of gloss is, the more excellent the image clearness is.

Although the detailed mechanism by which the above effect is obtained is unknown, it is presumed as follows.

The thermosetting resin layer in the laminated body according to the invention contains two or more kinds of organometallic complex, the surface roughness of the protective film at a side contacting the thermosetting resin is 30 nm or less, and the amount of nitrogen atoms present at the surface of the protective film at the side of the thermosetting resin layer side is less than 1 atm %. Thus, a reaction through nitrogen atoms to a layer adjacent to the thermosetting resin layer is suppressed, then it is presumed that cohesive failure when the protective film is peeled off is further suppressed, the roughness of the surface of the thermosetting resin layer can be suppressed to be small, and the thermosetting resin layer is excellent in image clearness.

Hereinafter, each configuration constituting the laminated body according to the invention will be described.

<Protective Film>

The laminated body according to the invention includes a protective film. The protective film is preferably an outermost layer of the laminated body according to the invention.

The protective film is preferably a layer formed of a thermoplastic resin from the viewpoint of image clearness, and a resin film made of a thermoplastic resin may be suitably used. The thermoplastic resin is not particularly limited as long as the thermoplastic resin can be formed into a film, a sheet, or the like.

The thermoplastic resin used for easily molding the thermoplastic resin layer may be used singly, or in combination of two or more kinds thereof.

The protective film is preferably in contact with a thermoplastic resin described later.

<<Tan δ>>

As the thermoplastic resin used for the protective film, the ratio of the storage elastic modulus and the loss elastic modulus in dynamic viscoelasticity measurement is measured as a sine tangent (tan δ), and the temperature at which the main peak of tan δ is shown is preferably 70° C. or more.

When the temperature at which the main peak of tan δ is shown is 70° C. or more, heat resistance is easily obtained, distortion of the film due to tension or the like in transportation can be suppressed, and deterioration of coating appearance on the protective film after coating of the thermosetting resin can be suppressed. The upper limit temperature of the main peak of tan δ is not particularly limited, but when a thermoplastic resin is integrally molded as a laminated body, it is preferable to have an upper limit temperature of the main peak of tan δ, and it is more preferable not to have a temperature at which wrinkles are formed in the molded body by heat input from the mold, because it is possible to suppress the influence of scratches in molding using a mold.

From the above viewpoint, the thermoplastic resin used for the protective film preferably contains a polyester resin. The protective film is particularly preferably a protective film formed from the same resin type as the thermoplastic resin composition contained in the thermoplastic resin layer.

The thermoplastic resin used for the protective film may be used singly or in combination of two or more kinds thereof.

The weight average molecular weight of the thermoplastic resin used for the protective film is not particularly limited as long as it is a molecular weight suitable for general film formation. For example, when polyester is used as the thermoplastic resin to be used for the protective film, the weight average molecular weight is preferably from 5,000 to 50,000, more preferably from 6,000 to 40,000, and still more preferably from 7,000 to 30,000.

The weight average molecular weight of the thermoplastic resin used for the protective film is determined by the same method as in the thermoplastic resin described later.

—Surface Roughness Ra—

The surface of the protective film at a side contacting the thermosetting resin layer has a surface roughness Ra (hereinafter, it is also referred to as "surface roughness Ra in the protective film") of 30 nm or less.

When the surface roughness Ra is within the above range, the image clearness after integrally molding the laminated body and the molded member is excellent. From the above viewpoint, the surface roughness Ra is preferably from 0.1 nm to 30 nm, more preferably from 1 nm to 30 nm, still more preferably from 5 nm to 30 nm, and particularly preferably from 10 nm to 30 nm.

In the specification, the surface roughness Ra in the protective film means a surface roughness of the protective film at a side contacting the thermosetting resin layer after the protective film is peeled off from the laminated body.

The surface roughness Ra (unit: nm) in the protective film represents a value measured by the following method using an optical interference type surface roughness meter (product name; NEWVIEW 7300, manufactured by Zygo Corporation).

First, a laminated body of 20 mm×100 mm is prepared, a peeling end is formed at an end of the protective film, and then the laminated body is set in a tensile tester such that the peeling angle is 90°, and the protective film is peeled off from the laminated body. The peeled protective film is sampled, cut into a size of 10 mm×10 mm, and attached to a glass slide such that the surface at the side contacting the thermosetting resin layer faces upward, thereby preparing a sample.

The obtained sample is subjected to aluminum vapor deposition for 5 minutes using liquid nitrogen with a vacuum vapor deposition machine (manufactured by JEOL Ltd., model number: JEE-AX), and then the surface roughness Ra is measured with the optical interference type surface roughness meter.

—Present Amount of Nitrogen Atoms—

The amount (hereinafter, it is also referred to as "nitrogen atom content in the protective film") of nitrogen atoms present at the surface of the protective film at the side of the thermosetting resin layer is less than 1 atm %.

An acid-based catalyst is commonly used as an initiator of the curing reaction of the thermosetting resin layer. When an alkaline compound having a nitrogen atom is contained in the material (resin) that forms the thermosetting resin layer and an adjacent layer (protective film at a side contacting thermosetting resin, release layer when the protective film includes a release layer, colored layer, and the like), the acid catalyst contained in the thermosetting resin layer easily reacts with the alkaline compound having a nitrogen atom in another layer adjacent to the thermosetting resin layer over time.

Because the nitrogen atom content in the protective film is less than 1 atm %, the reaction to the layer adjacent to the thermosetting resin layer through nitrogen atoms is suppressed as described above, and then cohesive failure when the protective film is peeled off is further suppressed, and the influence on the surface roughness of the thermosetting resin layer is reduced, leading to excellent image clearness.

From the above viewpoint, the nitrogen atom content in the protective film is more preferably 0.5 atm % or less, more preferably 0.3 atm % or less, and the protective film is still more preferably substantially free of nitrogen atoms.

In the specification, "substantially free" means that the content is less than 0.1 atm %.

The amount of nitrogen atoms present at the protective film is determined by X-ray photoelectron spectroscopy (XPS).

Specifically, it can be determined by peeling the protective film from the laminated body, and measuring the surface of the protective film at the side of the thermosetting resin layer using a surface analyzer (manufactured by Thermo Fisher Scientific Inc., product name: K-ALPHA). By using the surface analyzer, the amount of nitrogen atoms present at the surface layer of about 1 nm in the thickness direction (depth) from the surface of the protective film at the side of the thermosetting resin layer can be measured.

The thickness of the protective film is preferably from 10 μm to 100 μm. The protective film is discarded in the end. The protective film is preferably excellent in economic efficiency as long as the film can satisfy the function. Therefore, the upper limit of the thickness is preferably 100 μm or less from the viewpoint of economic efficiency. In addition, by securing rigidity as a protective film, it is possible to keep the surface appearance of the thermosetting resin layer to be pasted beautiful. Thus the lower limit of the thickness is preferably 10 μm or more from the viewpoint of securing rigidity. The thickness is more preferably 20 μm or more, particularly preferably 30 μm or more, and the upper limit of the thickness is 75 μm or less, and particularly preferably 50 μm or less.

The thickness of the protective film can be determined from an image and a scale obtained by observing a cross section of the laminated body with a stereoscopic microscope.

The protective film may have a release layer on the surface at the side of the thermosetting resin layer. As the release layer, a release layer made of a resin having low surface energy is preferable, and a release layer made of an olefin resin, a silicone resin, or a fluororesin can be preferably exemplified. It is preferable to have a release layer made of a silicone resin because the release layer can be used at low cost and has excellent heat resistance.

<Thermosetting Resin Layer>

The laminated body according to the invention has a thermosetting resin layer.

It is presumed that when the thermosetting resin layer before integral molding is not cured, the resin component of the thermosetting resin layer is likely to flow due to a heat treatment in integral molding, and surface roughness like a wave for example is likely to occur on the surface of the thermosetting resin layer. When the curing of the thermosetting resin layer is completed, followability in integrally molding the thermosetting resin layer is likely to be poor, and breaking and cracking are likely to occur in the thermosetting resin layer due to stress at the time of integral molding, and thus the surface of the thermosetting resin layer becomes rough, then there is a possibility that image clearness is not obtained.

From the above viewpoint, the thermosetting resin layer is preferably a thermosetting resin layer that is cured during and after integral molding and is curable before integral molding.

The thermosetting resin layer contains two or more kinds of organometallic complex. The thermosetting resin layer preferably has an aspect of containing two kinds of organometallic complex.

By the thermosetting resin layer containing two or more kinds of organometallic complex, the organometallic complexes act as catalysts when the laminated body and the molded member are integrally molded, then the reactivity when the laminated body according to the invention and the molded member are integrally molded is excellent, and the thermosetting resin can be cured during and after integral molding, and before integral molding.

That is, from the above viewpoint, the two or more kinds of organometallic complex preferably include an organometallic complex that contributes to curing of the thermosetting resin layer during and after integral molding, and an organometallic complex that contributes to curing of the thermosetting resin before integral molding.

—Organometallic Complex—

The organometallic complex is a compound containing a metal-carbon bond in which carbon is directly bonded to a metal, and an organometallic complex having a transition metal element, or a group 12 element, a group 13 element, a group 14 element, or the like may be exemplified.

From the viewpoint of reactivity in integral molding, the organometallic complex is preferably an organometallic complex having at least one metal selected from the group consisting of B, Al, Mg, Mn, Ti, Cu, Co, Zn, and Zr, more preferably an organometallic complex having at least one metal selected from the group consisting of B and Al, and still more preferably a metal complex having boron (B).

The organometallic complex in the invention can be easily obtained by reacting a metal alkoxide with a chelating agent. Examples of the chelating agent include β-diketones such as acetylacetone, benzylacetone, benzoylacetone, and dibenzoylmethane, and β-ketoacid esters such as ethyl acetoacetate and ethyl benzoylacetate.

From the viewpoint of reactivity in coating of the thermosetting resin layer and reactivity in integral molding, the organometallic complex is preferably an acetylacetone complex or a benzylacetone complex, and more preferably an acetylacetone complex of B and/or Al or a benzylacetone complex of B and/or Al.

Examples of the acetylacetone complex include aluminum acetylacetone complexes such as ethyl acetoacetate aluminum diisopropylate, aluminum tris(ethyl acetoacetate), alkyl acetoacetate aluminum diisopropylate, aluminum monoacetylacetate bis(ethyl acetoacetate), and aluminum tris(acetylacetonate), and benzylacetone complexes such as aluminum trisbenzylacetonate.

Examples of the benzylacetone complex include boronium acetylacetone complexes such as ethyl acetoacetate aluminum diisopropylate, boronium tris(ethyl acetoacetate), alkyl acetoacetate boronium diisopropylate, boronium monoacetylacetate bis(ethyl acetoacetate), and boronium tris(acetylacetonate), and benzylacetone complexes such as boronium trisbenzylacetonate.

From the viewpoint of storage stability and availability, boronium trisacetylacetonate and boronium trisbenzylacetonate are particularly preferable as the organometallic complex.

—Total Content of Organometallic Complex—

The total content of the organometallic complex is preferably from 0.5 parts by mass to 5 parts by mass, more preferably from 1 part by mass to 3 parts by mass, and still more preferably from 1 part by mass to 2.5 parts by mass, with respect to 100 parts by mass of the thermosetting resin composition.

—Thermosetting Resin Composition—

The thermosetting resin layer may be formed using a thermosetting resin composition, and the thermosetting resin contained in the thermosetting resin composition is preferably a resin having a thermosetting reactive group.

Examples of the thermosetting reactive group include an epoxy group, a carboxyl group, a hydroxyl group, an amide group, an amino group, an acid anhydride group, and a (block) isocyanate group.

Examples of the thermosetting resin include a thermosetting polyester resin, a thermosetting (meth)acrylic resin, a thermosetting fluorine-based resin (for example, a fluoroethylene-vinyl ether (FEVE) copolymer resin), and a thermosetting polyethylene resin.

Among the thermosetting resins, a thermosetting (meth)acrylic resin is preferable from the viewpoint of image clearness.

The thermosetting reactive group may be introduced into the thermosetting (meth)acrylic resin using a vinyl monomer having the thermosetting reactive group. The vinyl monomer having a thermosetting reactive group may be a (meth)acrylic monomer (monomer having a (meth)acryloyl group) or a vinyl monomer other than a (meth)acrylic monomer.

The thermosetting reactive group of the (meth)acrylic resin is preferably at least one group selected from the group consisting of an epoxy group, a carboxyl group, and a hydroxyl group from the viewpoint of easy production of the (meth)acrylic resin. In particular, from the viewpoint of excellent coating film appearance, the thermosetting reactive group is more preferably at least one group selected from the group consisting of an epoxy group and a hydroxyl group.

Examples of the vinyl monomer having an epoxy group as a curable reactive group include various chain epoxy group-containing monomers such as glycidyl (meth)acrylate, β-methylglycidyl (meth)acrylate, glycidyl vinyl ether, and allyl glycidyl ether, various (2-oxo-1,3-oxolane) group-containing vinyl monomers such as (2-oxo-1,3-oxolane) methyl (meth)acrylate, and various alicyclic epoxy group-containing vinyl monomers such as 3,4-epoxycyclohexyl (meth)acrylate, 3,4-epoxycyclohexylmethyl (meth)acrylate, and 3,4-epoxycyclohexyl ethyl (meth)acrylate.

Among them, 3,4-epoxycyclohexyl (meth)acrylate is preferable.

Examples of the vinyl monomer having a hydroxyl group as a curable reactive group include hydroxyl group-containing vinyl monomers such as 2-hydroxyethyl (meth)acrylate, 2-hydroxypropyl (meth)acrylate, 4-hydroxybutyl (meth)acrylate, and ε-caprolactone adducts of 2-hydroxyethyl (meth)acrylate.

Among them, an ε-caprolactone adduct of 2-hydroxyethyl (meth)acrylate is preferable.

—Thickness of Thermosetting Resin Layer—

The thickness of the thermosetting resin layer is preferably in the range of from 1 μm to 100 μm. When the thickness of the thermosetting resin layer is within the above range, not only the thermosetting resin is excellent in image clearness but also excellent scratch resistance and chemical resistance required from the viewpoint of decorative properties can be obtained.

The upper limit of the thickness of the thermosetting resin layer may be appropriately set depending on the drying ability at the time of coating, and from the viewpoint of economic efficiency, because it is not necessary to place a large amount of the thermosetting resin layer, the upper limit is preferably 75 µm or less, more preferably 50 µm or less, and still more preferably 30 µm or less.

The lower limit of the thickness of the thermosetting resin layer is preferably 5 µm or more, more preferably 10 µm or more, and still more preferably 15 µm or more in order to further exhibit image clearness and scratch resistance.

The thickness of the thermosetting resin layer may be determined from an image and a scale obtained by observing a cross section of the laminated body with a stereoscopic microscope.

<Thermoplastic Resin Layer>

The thermoplastic resin layer disposed in layers in the laminated body according to the invention is a layer containing a thermoplastic resin, and a resin film made of a thermoplastic resin may be suitably used. The thermoplastic resin is not particularly limited as long as the thermoplastic resin can be formed into a film, a sheet, or the like.

The thermoplastic resin to be used for the thermoplastic resin layer may be used singly, or in combination of two or more kinds thereof.

As the thermoplastic resin, known resins per se for example, polyolefin resins such as polyethylene, polypropylene, poly(4-methylpentene-1), and polyacetal, cycloolefins such as ring-opened metathesis polymers of norbornenes, addition polymers, and addition copolymers with other olefins, biodegradable polymers such as polylactic acid/polybutyl succinate, polyamide resins such as nylon 6, nylon 11, nylon 12, and nylon 66, aramid, polymethyl methacrylate, polyvinyl chloride, polyvinylidene chloride, polyvinyl alcohol, polyvinyl butyral, ethylene vinyl acetate copolymer, polyacetal, polyglycolic acid, polyester resins such as polystyrene, styrene copolymerized polymethyl methacrylate, polycarbonate, polypropylene terephthalate, polyethylene terephthalate (PET), polyethylene isophthalate (IAPET), polybutylene terephthalate (PBT), polyethylene-2, 6-naphthalate (PEN), polyether sulfone, polyether ketone, modified polyphenylene ether, polyphenylene sulfide, polyetherimide, polyimide, polyarylate, tetrafluoroethylene-6 fluoropropylene copolymer, polyvinylidene fluoride, and acrylonitrile-butadiene-styrene copolymer may be used.

Among them, from the viewpoint of excellent image clearness and moldability, the thermoplastic resin is preferably at least one resin selected from the group consisting of a polymethyl methacrylate resin, a polycarbonate resin, and a polyester resin. In particular, the thermoplastic resin is more preferably a polyester resin because flatness is easily imparted by stretching or the like, and uniform molding is possible due to resistance expression associated with an increase in stress during molding, and in view of chemical resistance and the like.

A polyester resin is a crystalline polymer, and tends to increase stress (indicate yield point) when the film is elongated. When a polyester resin is elongated, stress can be increased by molecular chain orientation.

As compared with a polymethyl methacrylate resin and a polycarbonate resin, stress of a polyester resin increases when the polyester resin is elongated, and thus the elongated region is hardly elongated. For this reason, even when elongation deformation occurs, because a resistance of the elongated region against the deformation is large, another deformable region deforms, and stress of the other deformable region increases.

When such a region is continuous, molding can be performed uniformly. As a result, unevenness in film thickness hardly occurs, and a beautiful appearance can be easily obtained because the thermosetting resin layer and the like disposed on an upper portion of the thermoplastic resin in layers also deform in conjunction with the thermoplastic resin.

The thermoplastic resin may be a homopolymer, a copolymer, or a mixture of thermoplastic resins.

The thermoplastic resin may be, for example, a thermoplastic resin composition to which an additive such as an antioxidant, an antistatic agent, a crystal nucleating agent, inorganic particles, organic particles, a viscosity-decreasing agent, a heat stabilizer, a lubricant, an infrared absorber, an ultraviolet absorber, or a doping agent for adjusting a refractive index is added.

In the case of using a polyester resin as the thermoplastic resin, preferred examples of the polyester resin include a polyester resin obtained by polymerization of monomers synthesized from an aromatic dicarboxylic acid, an aliphatic dicarboxylic acid, or an ester-forming derivative thereof and a diol or an ester-forming derivative thereof, and those known per se may be used.

The aromatic dicarboxylic acid is not particularly limited, and examples thereof include terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenylsulfonedicarboxylic acid, 4,4'-diphenyldicarboxylic acid, and ester-forming derivatives thereof.

The aliphatic dicarboxylic acid is not particularly limited, and examples thereof include adipic acid, sebacic acid, dimer acid, dodecanedionic acid, cyclohexanedicarboxylic acid, and ester-forming derivatives thereof.

Among them, an aromatic dicarboxylic acid is preferable as the dicarboxylic acid used in the polyester resin, and terephthalic acid, isophthalic acid, 2,6-naphthalenedicarboxylic acid, or an ester-forming derivative thereof is more preferable because they are excellent in heat resistance and can provide flatness after integral molding.

These acid components may be used singly or in combination of two or more kinds thereof, and may be partially copolymerized with an oxyacid of hydroxybenzoic acid or the like.

Examples of the diol include ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol, 2,2-bis(4-hydroxyethoxyphenyl) propane, isosorbate, spiroglycol, and ester-forming derivatives thereof.

Among them, the diol is preferably at least one diol selected from the group consisting of ethylene glycol, 1,3-butanediol, 1,4-butanediol, and ester-forming derivatives thereof because the diol is excellent in heat resistance and can have flatness after integral molding.

These diol components may be used singly or in combination of two or more kinds thereof.

When a polyester resin is used as the thermoplastic resin, from the viewpoint of achieving both moldability and flatness, the polyester resin is preferably a polyester resin having a structural unit derived from at least one monomer selected from the group consisting of ethylene terephthalate, ethylene isophthalate, ethylene naphthalene dicarboxylate, butylene terephthalate, butylene naphthalene dicarboxylate, hexamethylene terephthalate, hexamethylene naphthalene dicarboxylate, 1,4-cyclohexanedimethylene terephthalate, and 1,4-cyclohexanedimethylene naphthalene dicarboxylate, and more preferably a polyester resin having a structural unit derived from at least one monomer selected from the group consisting of ethylene terephthalate, butylene terephthalate, and ethylene isophthalate.

The polyester resin is not limited to a homopolymer of the monomer, and may be a copolymer using two or more kinds of the monomers, or may be a mixture of two or more kinds of polyester resins.

From the viewpoint of moldability and image clearness in integral molding, the polyester resin is preferably a mixture of two or more kinds of polyester resin, more preferably a mixture containing at least two selected from the group consisting of polyethylene terephthalate, polyethylene isophthalate, and polybutylene terephthalate, and still more preferably a mixture of polyethylene isophthalate and polybutylene terephthalate.

From the viewpoint of excellent moldability in integral molding, the polyester resin is preferably a polyester resin having a structural unit derived from at least one selected from the group consisting of butylene terephthalate and ethylene isophthalate.

Because it is excellent in moldability at the time of integral molding in particular, it is particularly preferable that the polyester resin has 80 mol % or more of structural units derived from butylene terephthalate and ethylene isophthalate, and from 2 mol % to 20 mol % of structural units derived from monomers other than butylene terephthalate and ethylene isophthalate, with respect to all structural units constituting the polyester resin, based on the number of moles.

—Molecular Weight—

The weight average molecular weight of the thermoplastic resin is not particularly limited as long as it is usually a molecular weight suitable for forming a film into a general film shape. For example, when a polyester is used as a resin, the weight average molecular weight is preferably from 5,000 to 50,000, more preferably from 6,000 to 40,000, and still more preferably from 7,000 to 30,000.

When the thermoplastic resin is a polyester resin, the weight average molecular weight may be determined by the following measurement method.

A sample of a thermoplastic resin was freeze-pulverized, and 1 mg of this sample was dissolved in 4 mL of a mixed solvent of hexafluoroisopropanol (HFIP):chloroform=1:1 overnight, diluted with 6 mL of chloroform, and then filtered through a 0.45 μm membrane filter to obtain a measurement solution.

The measurement solution prepared by the above method was measured with a gel permeation chromatography (GPC) analyzer under the following conditions. The weight average molecular weight was calculated as a value converted to standard polystyrene.

Device name; manufactured by Tosoh Corporation, model number; HLC-8320GPC
Column: TSK-GEL GMHHR-M (manufactured by Tosoh Corporation)×2 columns
Flow rate: 1.0 mL/min
Column temperature: 40° C.
Detector: UV
Injection amount: 200 μL —Thickness of Thermoplastic Resin Layer—

The thickness of the thermoplastic resin layer is preferably in the range of from 10 μm to 300 μm. When the thickness of the thermoplastic resin is within the above range, moldability is excellent. The thermoplastic resin layer does not need to be excessively thick from the viewpoint of economic efficiency, but preferably has a certain thickness from the viewpoint of molding of a metal member, heat input in molding of a resin member, and stress relaxation in the thickness direction.

From the above viewpoint, the thickness of the thermoplastic resin layer is preferably 25 μm or more, more preferably 50 μm or more, and still more preferably 75 μm or more. From the above viewpoint, the thickness of the thermoplastic resin layer is preferably 250 μm or less, more preferably 200 μm or less, and still more preferably 150 μm or less.

The thickness of the thermoplastic resin layer may be determined from an image and a scale obtained by observing a cross section of the laminated body with a stereoscopic microscope.

The thermoplastic resin layer may contain an additive such as a filler for lubricity, an ultraviolet inhibitor, or an antioxidant.

Examples of the filler include inorganic fillers such as metal hydroxides, metal oxides, metal carbonates, metal sulfates, and clay minerals, and organic fillers such as particles made of a crosslinked polymer and particles made of a heat-resistant polymer.

When the thermoplastic resin layer contains a filler, the filler is preferably an inorganic filler, more preferably alumina, silica, or mica.

The average particle diameter of the filler is preferably from 0.02 μm to 2.0 μm, and more preferably from 0.1 μm to 1.8 μm from the viewpoint of easily obtaining transparency.

When the thermoplastic resin layer contains a filler, the content of the filler is preferably from 0.1% by mass to 0.001% by mass, more preferably from 0.5% by mass to 0.05% by mass with respect to the total mass of the thermoplastic resin layer.

—Surface Roughness Ra—

The surface roughness Ra of the thermoplastic resin layer at a side contacting the thermosetting resin layer is preferably 100 nm or less, and more preferably 50 nm or less.

—Total Light Transmittance—

The total light transmittance of the thermoplastic resin layer at a wavelength of 380 nm to 780 nm (visible light region) at a temperature of 23° C. is preferably 80% or more, more preferably 85% or more, and still more preferably 90% or more from the viewpoint of image clearness.

The total light transmittance may be determined by a measurement using a spectrophotometer (manufactured by Shimadzu Corporation, product name; UV-3101PC).

The thermoplastic resin layer is preferably a melt-extruded film, and is preferably a biaxially oriented film in which molecular chains are oriented by stretching the film in two directions orthogonal to each other in the plane, from the viewpoint of achieving both moldability and flatness in integral molding.

The thermoplastic resin layer is preferably subjected to a surface treatment, and a surface modification layer that assists adhesion is preferably provided on at the side of the thermosetting resin layer.

The surface modification layer may be provided for example by an in-line method in which the surface modification layer is provided in a process when a thermoplastic resin is formed, and an off-line method in which the surface modification layer is provided in another process after the thermoplastic resin layer is formed. When a polyester resin is used as the thermoplastic resin, an in-line method in which a water-soluble resin is applied is preferable because of economic efficiency, high temperature of heat that can be imparted in the process, and open system and limited solvent use equipment.

The resin for forming the surface modification layer may be appropriately set depending on the type of resin to be layered on the surface modification layer, and is preferably a polyester resin, an acrylic resin, or a urethane resin. These resins may be used in combination of two or more kinds thereof, or may be a copolymer of these resins.

The resin for forming the surface modification layer is preferably used as a coating material dispersed in water, and it is also a preferable aspect to add an additive such as a surfactant, a curing agent, or a filler in order to secure dispersibility and to cure the film in coating.

In a case in which it is desired that the laminated body has, for example, a metallic color, it is also possible to vapor-deposit metal on the thermoplastic resin and use the vapor-deposited metal as a colored layer. In this case, examples of the metal species include indium, aluminum, and silver, and indium is preferable from the viewpoint of molding followability.

—Other Layer—

The laminated body according to the invention may have a layer (hereinafter, it is also referred to as "other layer") other than the protective film, the thermoplastic resin layer, and the thermosetting resin layer. When the laminated body has another layer, the other layer is preferably formed between the thermoplastic resin layer and the thermosetting resin layer or on the side opposite to the surface of the thermoplastic resin layer on which the thermosetting resin layer is formed.

Examples of the other layer include a colored layer, a clear pearl layer, a backer layer, an adhesive layer, or an easily adhesive layer.

[Colored Layer]

The laminated body according to the invention preferably further includes a colored layer between the thermoplastic resin layer and the thermosetting resin layer from the viewpoint of designability of the members.

The component constituting the colored layer is not particularly limited, and examples thereof include a binder resin, a pigment, a dye, and if necessary, an extender pigment, a solvent, a stabilizer, a plasticizer, a catalyst, or a curing agent. These compounds may be appropriately mixed to form the colored layer.

The coloring agent is not particularly limited, and examples thereof include inorganic pigments such as carbon black (India ink), iron black, titanium white, antimony white, chrome yellow, titanium yellow, red oxide, cadmium red, ultramarine, and cobalt blue; organic pigments or dyes such as quinacridone red, isoindolinone yellow, and phthalocyanine blue; metal pigments composed of scale-like foil pieces of aluminum, brass, or the like; and pearlescent (pearl) pigments composed of scale-like foil pieces of titanium dioxide-coated mica, basic lead carbonate, or the like.

The binder resin used for mixing the coloring agent preferably has moldability.

When the colored layer is adjacent to the thermosetting resin layer, from the viewpoint of the reactivity of the thermosetting resin layer, the colored layer preferably contains a colored material in which the amount of nitrogen atoms present in the colored layer is 10 atm % or less, more preferably contains a colored material in which the amount of nitrogen atoms present is 5 atm % or less, still more preferably contains a colored material in which the amount of nitrogen atoms present is 1 atm % or less, and particularly preferably contains a colored material that is substantially free of nitrogen atoms.

In the specification, "substantially free of" means that the amount of nitrogen atoms present is less than 0.1 atm %.

—Adhesive Layer—

When the laminated body according to the invention has an adhesive layer as other layer, the thickness of the adhesive layer is preferably from 1 μm to 30 μm, and preferably from 5 μm to 25 μm from the viewpoint of durability.

The adhesive layer may be usually formed of an adhesive composition used as an adhesive layer.

<Method of Producing Laminated Body>

As one embodiment of the method of producing a laminated body according to the invention, an example in which a biaxially stretched polyester film is a thermoplastic resin layer will be described below.

The thermoplastic resin layer is preferably biaxially stretched, that is, a biaxially oriented film. When the thermoplastic resin layer is biaxially stretched, chemical resistance and durability can be expected to be improved, and not only strength as a film can be imparted, but also stress resistance at the time of elongation deformation can be imparted in molding as described above, which is preferable.

The polyester resin is not particularly limited, and may be obtained by, for example, purchasing a commercially available polyester resin raw material and performing polycondensation by a known method.

—Preparation Step—

The preparation step includes a step of drying a resin to be a raw material.

The drying method is not particularly limited, and it is preferable to perform drying at, for example, 160° C. for about 5 hours in a nitrogen atmosphere, a vacuum atmosphere, or the like. The drying temperature and the drying time are not particularly limited as long as the moisture content in the polyester resin is preferably 50 ppm or less.

In a case in which melt extrusion is performed using a vented twin screw extruder, the preparation step of drying a resin to be a raw material may be omitted.

—Melt Extrusion Step and Film Formation Step—

In the melt extrusion step, the polyester resin raw material obtained in the preparation step is charged into an extruder and melt-kneaded in a cylinder.

The method of producing a thermoplastic resin layer preferably includes a step of removing foreign substances from the molten polyester resin and leveling an extrusion amount of the molten polyester resin through a filter or a gear pump, and discharging the polyester resin in a sheet shape from a T-die onto a cooling drum to form a film (film formation step).

At this time, extrusion may be performed in a single layer or in multiple layers. The melt-extruded molten polyester resin is preferably cooled on a support and solidified to be formed into a sheet shape.

In the film formation step, the polyester resin melt-extruded in the melt-extrusion step may be cooled to form a polyester resin sheet (thermoplastic resin layer). In the film formation step, for example, the sheet-shaped polymer may be brought into close contact with a casting drum by a method in which electrostatic application is performed using a wire electrode or a tape electrode, a casting method in which a water film is provided between the casting drum and the extruded polymer sheet, a method in which the casting drum temperature is adjusted to a range from the glass transition temperature of the polyester to the glass transition temperature −20° C. and the extruded polymer is adhered, or a method in which a plurality of these methods are combined, and the sheet-shaped polymer is cooled and solidified to obtain an unstretched polyester resin film (base material film).

Among these casting methods, a method in which electrostatic application is performed is preferable from the viewpoint of productivity and planarity of the polyester resin.

—Stretching Step—

In the stretching step, examples of the method of stretching the unstretched polyester film obtained in the melt extrusion step include a sequential biaxial stretching method in which the unstretched polyester film is stretched in the longitudinal direction and then stretched in the width direction, or stretched in the width direction and then stretched in the longitudinal direction, and a simultaneous biaxial stretching method in which the unstretched polyester film is stretched substantially simultaneously in the longitudinal direction and the width direction. The method of stretching the unstretched polyester film may be appropriately selected.

As a stretch ratio, though depending on the type of resin, the film is preferably stretched from 2.5 times to 4.0 times, more preferably from 2.8 times to 3.5 times, and still more preferably from 3.0 times to 3.4 times in the width direction and the longitudinal direction.

As a ratio of area expansion, from 6 times to 20 times of expansion is preferable from the viewpoint of film formation stability, and in the case of a film using polyethylene terephthalate (PET), an area expansion of from 8 times to 20 times is more preferable.

The film is desirably stretched at a stretching speed of from 1,000%/min to 200,000%/min in the stretching directions of the width direction and the longitudinal direction.

The stretching temperature is preferably from the glass transition temperature to the glass transition temperature 120° C., further preferably from the glass transition temperature+10° C. to the glass transition temperature+60° C. For example, when a polyethylene terephthalate film is stretched, the stretching temperature is preferably from 75° C. to 130° C., in particular, the stretching temperature in the longitudinal direction is preferably from 80° C. to 120° C., and the stretching temperature in the width direction is preferably from 90° C. to 110° C.

The stretching may be performed a plurality of times in each direction.

As the stretching method, a publicly known method may be applied, and for example, any of a roll stretching method, a stretching method in which the film is guided to a tenter and conveyed while holding both ends of the film with clips, and the like may be adopted.

—Heat Treatment Step—

The biaxially stretched laminated body is preferably further subjected to a heat treatment at a temperature of from a stretching temperature to a melting point in a tenter in order to impart flatness and dimensional stability.

The biaxially stretched laminated body is gradually cooled uniformly after the heat treatment, cooled to room temperature, and then wound up.

In addition, if necessary, a relaxation treatment may be performed in the longitudinal direction and/or the width direction during gradual cooling from the heat treatment.

—Thermosetting Resin Layer Formation Step—

In the thermosetting resin layer formation step, a coating liquid for forming a thermosetting resin layer is applied (in-line coating) to the thermoplastic resin layer in the film formation step of the thermoplastic resin layer to form the thermosetting resin layer.

Examples of the method of applying the coating liquid for forming a thermosetting resin layer, heat treatment conditions, and the like include the same methods as the method of applying a thermosetting resin layer in Examples described later.

—Protective Film Formation Step—

By laminating the protective film having a release layer onto a surface of the thermosetting resin layer such that the release layer side is in contact with the thermosetting resin layer, a laminated body in which the thermoplastic resin layer, the thermosetting resin layer, and the protective film are laminated in this order can be produced.

In the laminated body according to the invention obtained by the production method described above, the degree of elongation at 150° C. is preferably 100% or more with respect to the film formation direction and the width direction. The upper limit of the degree of elongation at 150° C. is not particularly limited, and a higher degree of elongation is more preferable.

When the degree of elongation of the laminated body at 150° C. is 100% or more with respect to the film formation direction and the width direction, the shape of the fiber-reinforced resin described later can be followed.

When the laminated body is elongated, the tensile stress increases. The tensile stress of the laminated body is generally preferably low because it becomes a resistance force against the molding force in integral molding. When the tensile stress is too low, protrusions and the like of the base material shape are excessively stretched, and defects such as uneven thickness are likely to occur.

From the viewpoint of smoothness, the tensile stress of the laminated body at 150° C. is preferably from 3 MPa to 50 MPa, and more preferably from 5 to 30 MPa.

The tensile stress of the laminated body preferably tends to monotonically increase with elongation. The term "monotonically increase with elongation" means that when the degree of elongation is taken as the horizontal axis and the stress is taken as the vertical axis, in the deformation after elastic deformation, a region where the increase in tensile stress is 0 or negative, that is, the inclination is zero or less, is 30% or less and further 20% or less in the elongation until fracture.

Hot pressing and in-mold molding themselves are conventionally known, and a coating step can be omitted by using the above-mentioned coating substitute film.

(Method of Producing Metal Member)

A method of producing a metal member according to the invention includes: subjecting the laminated body and a heated steel plate to thermocompression bonding and press molding; and curing the thermosetting resin layer.

Examples of the steel plate used in the method of producing a metal member according to the invention include a steel plate (metal member) used for an exterior component of a vehicle. In general, a steel material having good moldability and a thickness of about from 0.3 mm to 0.6 mm may be suitably used. In addition, a steel material used for the exterior of a vehicle is preferably subjected to zinc alloy plating as rustproof treatment.

Regarding the temperature at which the steel plate is heated, a condition may be adopted under which the entire laminated body is not melted, but the surface of the thermoplastic resin layer in the laminated body in contact with the steel plate (metal member) is at least melted. From such a viewpoint, cold working is preferable as the working of the metal member. Regarding the rate controlling of moldability in cold pressing method, the degree of elongation of metal is lower than the degree of elongation of resins even at room temperature. Thus, the resin film is easily firmly bonded to the steel plate even after press molding by previously bonding the resin layer by thermocompression bonding.

[Thermocompression Bonding]

The steel plate is usually wound in a roll shape, and the laminated body may also be formed into a product as a rolled laminated body. Therefore, when a roll-shaped steel plate and a laminated body are used, a roll-to-roll lamination is possible. For example, the steel plate may be heated, and the thermoplastic resin layer side of the supplied laminated body may be thermocompression-bonded to bond the film to the steel plate.

In order to complete melting and cooling solidification in the thermoplastic resin layer, it is preferable that the laminated body is cooled from the protective film side when the surface of the thermoplastic resin layer of the laminated body is bonded to the heated steel plate.

The temperature of the laminate roll at the time of bonding the laminated body is preferably set to a low temperature to such an extent that the thermoplastic resin layer is not melted.

That is, it is presumed that the steel plate side is in a heated state, and the protective film side is in a cooled state by interposing the laminated body, which makes it possible to complete melting and cooling solidification in the thermoplastic resin layer, and the interface is mixed inside the molten resin, thereby further improving the adhesive force.

[Press Molding]

The steel plate (laminated steel plate) in which the steel plate and the laminated body are integrated by thermocompression bonding is press-molded. As the press molding, the cold press molding is preferable. When cold press molding is performed on the laminated steel plate, the molding may be overhang molding in which an end portion of the steel plate is held at a high pressure, or may be molding in which the steel plate is held at a low pressure and sucked by molding. By thermally fusing the thermoplastic resin layer in the laminated body, the steel plate (metal member) may be covered.

The pressure for the molding by a press molding method varies depending on the size of the base material to be molded, the thickness of the thermoplastic resin layer, and the like, and the load is usually preferably from 10 tons (t) to 0.100 tons (t) in a case in which the molded base material has a size of about 500 mm×500 mm.

(Method of Producing Resin Member)

The method of producing a resin member according to the invention includes: inserting the laminated body into a mold; then injection molding a resin in a molten state to perform in-mold molding; and curing the thermosetting resin layer during a period of time to completion of the in-mold molding.

The method of producing a resin member according to the invention includes: vacuum heat molding the laminated body; and curing the thermosetting resin layer during a period of time from before the vacuum heat molding to completion of the vacuum heat molding.

[In-Mold Molding]

In the method of producing a resin member according to the present disclosure, the laminated body is inserted into a mold or the like, and a resin in a molten state is injection molded and subjected to in-mold molding. At that time, the thermosetting resin layer is cured during a period of time to completion of the in-mold molding, that is, before the laminated body is placed in a mold, the thermosetting resin is cured at the stage of shaping the laminated body into a shape conforming to the mold shape, or the thermosetting resin layer is cured using the heat of the in-mold molding, or the thermosetting resin layer is cured by application of heat once after insertion into the mold, and then in-mold molding is performed.

The resin used for injection molding is preferably at least one resin selected from the group consisting of a polyolefin resin, a polyamide resin, a polycarbonate resin, an ABS resin (acrylonitrile, butadiene, and styrene copolymer resins), a polyester resin, and a polyphenylene sulfide resin, and more preferably a polyolefin resin. Among polyolefin resins, a polypropylene resin is more preferable from the viewpoint of strength, chemical resistance, and lightweight properties required for vehicle exterior parts. In order to satisfy the characteristics as a molded member, reinforcing fibers, additives, and the like may be added to the resin, and the resin may be copolymerized with another resin, or may be blended with another resin.

In injection molding, a resin in a molten state is injected from a gate of a mold and cooled and solidified to complete the injection molding. The temperature of the resin in a molten state may be a temperature corresponding to the melting point of the resin to be used.

At the temperature, the thermoplastic resin layer of the laminated body partially melts in the thickness direction, and the interface is mixed and then cooled and solidified. Thus, molding having strong adhesive force can be performed. The mold at the time of injection molding is preferably cooled to a temperature within a range that does not impair the appearance of the laminated body and used, similarly to the melting temperature of the resin to be injected.

<Vacuum Heat Molding>

The method of producing a resin member according to the invention includes vacuum heat molding using the laminated body according to the invention.

The vacuum heat pressure molding method is not particularly limited, and a press molding method, an autoclave molding method, a bagging molding method, a wrapping tape method, an internal pressure molding method, a TOM molding method, and the like can be adopted. A press molding method and a TOM molding method are preferable from the viewpoint of enhancing adhesion with each resin layer at the time of integral molding, and a TOM molding method is preferable from the viewpoint of the degree of freedom of the shape of the resin base material.

The molding temperature (or curing time) in the heat pressure molding method may be appropriately selected depending on the type of each resin layer. From the viewpoint of moldability of the thermoplastic resin, the temperature is usually preferably from 80° C. to 180° C.

EXAMPLES

Hereinafter, the invention will be described more specifically with reference to Examples. The invention is not limited to these Examples. Each value in Examples was obtained according to the following method. In Examples, "part" represents "part by mass", and "%" represents "% by mass".

(Protective Film)

Terephthalic acid and ethylene glycol were polymerized to obtain a polyester P1. A resin of the polyester P1 was mixed with silica particles having an average particle diameter of 1.6 μm to obtain a silica particle-containing polyester R1.

The polyester P1 and the silica particle-containing polyester R1 were dried at 160° C. for 4 hours to remove moisture, then supplied to a hopper such that P1 and R1 were P1/R1=90/10 in terms of a mass ratio, subjected to chip mixing, and then melt-extruded into a sheet shape from an extruder set at 280° C. using a die. The weight average molecular weight of the obtained melt-extruded sheet was 40,000.

After the extrusion, the sheet was immediately cooled by a casting drum having a temperature of 20° C. to obtain a cast film, and then stretched 3.4 times at 90° C. in a subsequent longitudinal stretching step. Thereafter, a coating material for forming a release layer containing dimethylpolysiloxane as a main component resin was applied to one surface of the uniaxial film by a microgravure coater such that the film thickness after drying was 80 nm.

The uniaxial film was then guided to a stenter step to dry the coating film to form a film. At the same time, the obtained uniaxial film was stretched such that the transverse stretching was 3.5 times at 105° C., and widened in the 1% width direction while being treated at 210° C. in a crystallization zone to suppress thermal shrinkage, then a biaxially stretched film having a thickness of 38 μm was formed and wound into a roll shape.

The main component resin represents a resin component having the largest proportion among the proportions represented by all the resin components.

(Thermosetting Resin Layer)

A reactor equipped with a stirrer, a thermometer, a reflux condenser, and a nitrogen inlet tube was charged with 40 parts of toluene and 50 parts of isobutyl acetate. The temperature was raised to 100° C. in a nitrogen atmosphere, and a mixture of 45 parts of 3,4-epoxycyclohexyl methyl acrylate as an alicyclic epoxy group-containing vinyl monomer, 55 parts of 10 mol ε-caprolactone adduct of 2-hydroxyethyl acrylate as a vinyl monomer containing a polyester in a side chain, and 7 parts of AIBN (polymerization initiator; azobisisobutyronitrile) was added dropwise over 2 hours. After completion of the dropwise addition, the mixture was held at the same temperature for 2 hours, and then a mixture of 1 part of AIBN and 1.0 parts of toluene was further added dropwise. Thereafter, the mixture was maintained at the same temperature for 4 hours to obtain an epoxy group-containing polyester-modified vinyl polymer solution A (hereinafter, the solution is also referred to as "solution A") having a nonvolatile content of 50% and a number average molecular weight of 7,000.

Next, 5 parts of methyl isobutyl ketone, 10 parts of n-butanol, 2 parts of an anilide oxalate-based ultraviolet absorber (product name: SANDUVOR 3206, Clariant (Japan) K.K.), 2 parts of a hindered amine-based light stabilizer (Product name: SANDUVOR 3058, Clariant (Japan) K.K.), and 1 part of boronium trisacetylacetonate and 1 part of boronium trisbenzylacetonate as organometallic complexes were added to 80 parts of the solution A, thereby obtaining a thermosetting resin composition A-1.

Example 1

(Thermoplastic Resin Layer)

A carboxylic acid component having a component molar ratio of terephthalic acid:isophthalic acid=90:10 and ethylene glycol were polymerized to obtain a polyester P2.

Terephthalic acid as a carboxylic acid component and butanediol were polymerized to obtain a polyester P3.

The polyester P2 as a resin component and silica particles having an average particle diameter of 1.6μ were mixed to obtain a silica particle-containing polyester R2.

The polyester P2, the polyester P3, and the silica particle-containing polyester R2 were dried at 160° C. for 4 hours to remove moisture, and then supplied to a hopper. The polyester P2, the polyester P3, and the silica particle-containing polyester R2 were supplied such that the mass ratio of P2, P3, and R2 was P2/P3/R2=50/40/10, subjected to chip mixing, and then melt-extruded into a sheet shape from an extruder set at 280° C. using a die. The weight average molecular weight of the obtained melt-extruded sheet was 55,000.

After the extrusion, the sheet was immediately cooled by a casting drum having a temperature of 20° C. to obtain a cast film, and then stretched 3.0 times at 70° C. in a subsequent longitudinal stretching step. Thereafter, the following surface treatment layer coating liquid was applied to both surfaces of the uniaxial film in a thickness of 40 nm by a roll coater, and then led to a stenter step to dry the coating film to form a film. At the same time, the obtained uniaxial film was stretched such that the transverse stretching was 3.2 times at 95° C., and while being treated at 210° C. in a crystallization zone, the film was widened in a 1% width direction to suppress thermal shrinkage, then a biaxially stretched film (thermoplastic resin layer) having a thickness of 50 μm was formed and wound into a roll shape.

<Surface Treatment Layer Coating Liquid>

An aqueous dispersion coating material was obtained by mixing 80 parts by weight of a coating material obtained by dispersing an acrylic resin copolymer obtained by subjecting 40 mol % of methyl methacrylate, 45 mol % of ethyl acrylate, 10 mol % of acrylonitrile, and 5 mol % of N-methylol acrylamide to an addition condensation reaction in water at a solid content of 30% with 20 parts by weight of a surfactant. The weight average molecular weight of the acrylic resin copolymer is 220,000.

(Laminated Body for Molding)

After the obtained roll-shaped biaxially stretched film (thermoplastic resin layer) was unwound, indium was vapor-deposited on one surface of the film in a vacuum oven, and then the film was wound into a roll shape again. Further, an acryl-based pressure sensitive adhesive layer was coated at 20 μm on the indium deposited surface side, and a sheet made of ABS (copolymer of acrylonitrile, butadiene, and styrene) and having a thickness of 250 μm was bonded to the acryl-based pressure sensitive adhesive layer.

On the side opposite to the metal deposited surface of the film, a curing agent prepared by dissolving 3 parts of triphenylsilanol in 97 parts of toluene was added in an amount of 10 parts with respect to 100 parts of the thermosetting resin composition A-1, and the film was coated by a comma coater such that the film thickness after drying was 15 μm. After the coating, the obtained material was dried at 90° C. in an oven, and after leaving the oven, the protective film produced above was laminated on the thermosetting resin layer and wound up into a roll shape to obtain a laminated body for molding.

(Integral Molding with Molded Member: Injection Molding)

The laminated body for molding was placed along a mold, and preliminarily shaped by vacuum molding. The preliminarily shaped laminated body for molding was set in a mold for film insert molding, an ABS resin was used as a molded member, and the molten ABS resin was injected into the mold by an extruder to integrally mold the preliminarily shaped laminated body for molding and the molded member, thereby preparing an integrally molded product.

Various evaluation results of the obtained laminated body for molding and integrally molded product are collectively shown in Table 1.

(Integral Molding with Molded Member: Vacuum Heat Molding (TOM Molding))

As a laminated body for molding, the laminated body before the ABS sheet was bonded was placed in a vacuum heat molding machine. In a lower chamber, a base material made of ABS resin was placed on a jig, and heating was performed such that the temperature of the laminated body was 140° C. by heating infrared rays while vacuuming. At the same time as the temperature reached a predetermined temperature, the base material was pushed up from the lower chamber toward the laminated body, and at the same time, an upper chamber was opened to atmospheric pressure, so that the laminated body was bonded to the base material by pressure, thereby preparing an integrally molded product.

Various evaluation results of the obtained laminated body for molding and integrally molded product are collectively shown in Table 1.

(Integral Molding with Molded Member: Press Molding with Laminated Steel Plate)

The laminated body for molding may be prepared as described later.

(Thermoplastic Resin Layer)

The polyester P1 and the polyester R1 were dried at 160° C. for 4 hours to remove moisture, then supplied to a hopper such that P1 and R1 had a mass ratio of P1/R1=90/10, subjected to chip mixing, and then melt-extruded into a sheet shape from an extruder set at 280° C. using a die. At this time, in a molten state, the polyester P2 and the polyester R2 were dried at 160° C. for 4 hours from another hopper to remove moisture, and then supplied to a hopper to merge the molten resins, and extruded into a sheet shape from a die as a two-layer laminated resin. The weight average molecular weight of the melt-extruded sheet was 60,000.

After the extrusion, the sheet was immediately cooled by a casting drum having a temperature of 20° C. to obtain a cast film, and then stretched 3.0 times at 70° C. in a subsequent longitudinal stretching step. Thereafter, the above-described surface treatment layer coating liquid was applied to both surfaces of the uniaxial film in a thickness of 40 nm by a roll coater, and then led to a stenter step to dry the coating film to form a film. At the same time, the obtained uniaxial film was stretched such that the transverse stretching was 3.2 times at 95° C., and while being treated at 210° C. in a crystallization zone, the film was widened in a 1% width direction to suppress thermal shrinkage, then a biaxially stretched film (thermoplastic resin layer) having a thickness of 50 μm was formed and wound into a roll shape.

(Laminated Body for Molding)

After the obtained roll-shaped biaxially stretched film (thermoplastic resin layer) was unwound, 10 parts of a curing agent in which 3 parts of triphenylsilanol was dissolved in 97 parts of toluene was added with respect to 100 parts of the thermosetting resin composition A-1, and the film was coated by a comma coater such that the film thickness after drying was 15 μm. After the coating, the obtained material was dried at 90° C. in an oven, and after leaving the oven, the protective film produced above was laminated on the thermosetting resin layer and wound up into a roll shape to obtain a laminated body for molding.

(Laminated Steel Plate)

After removing an adhering oil of a galvanized steel plate 270F with a solvent, the steel plate was heated to 260° C., and the laminated body for molding was laminated on the steel plate at a speed of 15 m/min.

(Steel Plate Press Molding)

An integrally molded product may be produced by press molding the laminated steel plate obtained using a 50 ton press machine.

(Thickness of Protective Film and Thermoplastic Resin Layer)

The thicknesses of the protective film and the thermoplastic resin layer were measured with a welding point type thickness meter (manufactured by Anritsu Corporation, product name: K-402B).

(Thickness of Thermosetting Resin Layer)

A cross-section observation of the obtained laminated body for molding was performed using a microscope, and the thickness was measured by actual measurement.

(Thickness of Release Layer)

The obtained protective film was ultra-thin sectioned with a microtome, and the cross section was observed with a transmission electron microscope (TEM) (image scale: 200 nm) and actually measured.

(Surface Roughness Ra)

With a light interference type surface roughness meter (product name; NEWVIEW 7300, manufactured by Zygo Corporation), surface roughness of the obtained protective film and the thermoplastic resin layer were measured. For the protective film and the thermoplastic resin layer, Ra was determined as a surface roughness of the base material before the laminated body for molding was produced.

(Nitrogen Component Analysis)

The amount of nitrogen atoms present at the surface of the obtained protective film at the side of the thermosetting resin layer was detected by XPS (X-ray photoelectron spectroscopy THERMO K-Alpha).

(Tan δ Peak Temperature)

The elastic modulus of the obtained protective film was measured with a dynamic viscoelasticity tester (product name; DMA6000 manufactured by PerkinElmer, Inc.) in the tensile direction. The storage elastic modulus and the loss elastic modulus at a frequency of 1 Hz at a temperature rising rate of 2° C./min were measured, the ratio thereof was measured as a sine tangent (tan δ), and the temperature (° C.) showing the peak value was determined.

(Peeling Force and 2 W Peeling Force)

Using an adhesive film peeling analysis device (Product name; VPA-3, manufactured by Kyowa Interface Science Co., Ltd.), the laminated body for molding was cut out with a width of 25 mm (100 mm×25 mm), the protective film was gripped and pulled in the 180 direction with the thermoplastic resin layer side being fixed to a jig. The force required for peeling off the protective film at this time was measured as a peeling force (N). The same measurement was performed for each of a sample immediately after the protective film was applied and a sample similarly cut out from a roll stored for 2 weeks at normal temperature (25° C.) and normal humidity (50%).

The 2 W peeling force means a force required for peeling the protective film from the sample cut out from the roll stored for two weeks.

(Unevenness Difference After Peeling)

The protective film was peeled off using a sample (100 mm×25 mm) cut out from a roll stored for 2 weeks under normal temperature (25° C.) and normal humidity (50%), and then the surface roughness (unevenness difference) of the surface of the thermosetting resin layer was measured with a light interference type surface roughness meter (product name; NEWVIEW 7300, manufactured by Zygo Corporation).

For the measurement of the surface roughness of the thermosetting resin before the protective film was peeled off, the surface of the thermosetting resin layer in a state where only the thermosetting resin was applied and the protective film was not laminated was measured in the same manner.

(Gloss After Coating, Gloss After Peeling, and Δ Gloss)

Using a sample (50 mm×50 mm) cut out from a roll stored for 2 weeks under normal temperature (25° C.) and normal humidity (50%), the protective film was peeled off, then the surface of the thermosetting resin layer was measured with a gloss meter (product name; PG-IIM, manufactured by NIPPON DENSHOKU INDUSTRIES CO., LTD.), and a gloss after peeling was obtained. For the measurement before the protective film was peeled off, the surface of the thermosetting resin layer in a state where only the thermosetting resin was applied and the protective film was not laminated was measured in the same manner, and a gloss after coating was obtained. The value obtained by subtracting the value of the gloss after coating from the value of the gloss after peeling was defined as a Δ gloss. It can be said that the larger the value of the Δ gloss (gloss level) (that is, a positive value), the better the glossiness.

(Total Light Transmittance)

The total light transmittance in the visible light region of the obtained thermoplastic resin layer was measured using a spectrophotometer (manufactured by Shimadzu Corporation, product name: UV-3101PC). The wavelength in the visible light region was 380 nm to 780 nm, the light reception was measured by an integrating sphere method, and the transmittance of the obtained optical spectrum was averaged to obtain the total light transmittance.

[Evaluation]

(Chemical resistance)

A test piece (50 mm×50 mm) was cut out from the obtained integrally molded product, and the protective film was peeled off to obtain a test piece. Each of various chemicals shown below was dropped in an amount of 1 mL onto the surface of the thermosetting resin layer of the test piece at room temperature (25° C.) for 10 minutes, and dried at 60° C. for 2 hours. Thereafter, the surface of the test piece (the surface of the thermosetting resin) was checked with eyes to check a change in the surface of the test piece.

Chemical liquid: gasoline, isopropanol, 5% by mass of sodium hydroxide, and 10% by mass of hydrochloric acid A: No visible change in appearance on the surface of the thermosetting resin was observed for all the chemical solutions.

B: Visible change in appearance on the surface of the thermosetting resin was observed with at least one chemical solution.

(Scratch Resistance)

A test piece (50 mm×50 mm) was cut out from the obtained molded article, and the protective film was peeled off to obtain a test piece. Glass wool was attached to a Gakushin friction tester (Color Fastness Rubbing Tester: manufactured by TESTER SANGYO CO., LTD.), the surface of the thermosetting resin layer of the test piece was rubbed with a load of 2N, and the surface of the test piece (the surface of the thermosetting resin) was checked with eyes to evaluate scratch resistance.

—Evaluation Criteria—

A: There is no scratch on the surface of the thermosetting resin, and a decrease in gloss level is not observed.

B: Slight scratches are observed on the surface of the thermosetting resin, but a decrease in gloss level is not observed.

C: Scratches are formed on the surface of the thermosetting resin, and a decrease in gloss level is observed.

(Adhesion)

A cross-shaped cut was made in a test piece (50 mm×50 mm) cut out from the obtained molded article such that the cut reaches the molded base material resin. To this test piece, water at 70° C. was applied at a pressure of 9 MPa from an angle of 45° using a pressure washer. A cut reaching the base material was placed in the test piece, and evaluation was performed by checking with eyes whether or not peeling was made on the cut surface of the test piece before and after water ejection.

—Evaluation Criteria—

A: There was no peeling from the cut portion, and good adhesion was exhibited.

B: Peeling was observed on the entire surface.

(Image Clearness)

For the obtained molded article, a regular reflection haze in a vicinity of 20° was measured using an appearance analyzer (manufactured by Konica Minolta Japan, INC., product name; RHOPOINT IQ-S). The smaller the measured value is, the better the image clearness is.

Examples 2 to 7 and Comparative Examples 1 to 6

A laminated body was produced in the same manner as in Example 1 except that the composition in Example 1 was changed to the composition shown in Table 1, and an integrally molded product of a molded member was obtained. The thermoplastic resin layers in Examples 4 and 5 and Comparative Example 6 contain titanium oxide in an added amount of 10% by mass with respect to the total mass of the thermoplastic resin layer. The colored layers in Examples 4 and 5 and Comparative Example 6 contain titanium oxide in an added amount of 10% by mass with respect to the total mass of the colored layer.

The obtained laminated body and integrally molded product were evaluated in the same manner as in Example 1.

In the case of containing colored particles such as titanium oxide, the haze is increased by containing colored particles. Thus, in evaluating the image clearness of Examples 4 and 5 and Comparative Example 6, the evaluation was made that the smaller the measured value is, the better the image clearness is, when molded articles containing colored particles were compared with each other.

TABLE 1

| | | | | Example 1 | Example 2 | Example 3 | Example 4 |
|---|---|---|---|---|---|---|---|
| Protective Film | Base Material | Kind | — | polyester | polyester | polyester | polyester |
| | | Thickness | μm | 38 | 38 | 38 | 38 |

TABLE 1-continued

|  |  |  |  |  |  |  |  |
|---|---|---|---|---|---|---|---|
|  | Release Layer | Kind | — | dimethylsiloxane | dimethylsiloxane | dimethylsiloxane | dimethylsiloxane |
|  | Physical Property | Surface Roughness/Ra | nm | 25 | 25 | 25 | 25 |
|  |  | Dry Thickness of Coating Film Layer | nm | 40 | 40 | 40 | 40 |
|  |  | Present amount of nitrogen atoms | atm % | Not detected | Not detected | Not detected | Not detected |
|  |  | tanδ Peak Temperature | ° C. | 95 | 95 | 95 | 95 |
| Thermosetting Resin Layer | Organometallic Complex | Metal Species | — | boron | boron/aluminum | boron | boron |
|  |  | Ligand First Component | — | acetylacetone | acetylacetone | acetylacetone | acetylacetone |
|  |  | Ligand Second Component | — | benzylacetone | benzylacetone | benzylacetone | benzylacetone |
|  | Physical Property | Thickness | μm | 15 | 15 | 15 | 15 |
| Thermoplastic Resin Layer | Component | Kind | — | copolymerized polyester | copolymerized polyester | copolymerized polyester | copolymerized polyester |
|  | Filler | Kind | — | aggregated silica | — | — | titanium oxide |
|  |  | Added Amount | ppm | 100 | — | — | 100,000 |
|  |  | Thickness | μm | 50 | 75 | 50 | 50 |
|  | Surface Treatment (kind) |  | — | crosslinked acrylic | — | crosslinked acrylic | crosslinked acrylic |
|  | Physical Property | Thickness | nm | 30 | — | 30 | 30 |
|  |  | Surface Roughness/Ra | nm | 35 | 10 | 5 | 1,000 |
|  |  | Total Light Transmittance | % | 88 | 92 | 90 | 8 |
| Colored Layer | Coating Material | Kind | — | — | — | — | titanium oxide |
|  | Vapor Deposition | Metal | — | indium | indium | indium | — |
| Other Layer | Backer Layer | Thickness | μm | 250 | 250 | 250 | 250 |
|  | Adhesive Layer | Thickness | μm | — | — | — | — |
| Laminated Body Evaluation | 180° Peeling Force |  | N | 0.04 | 0.04 | 0.04 | 0.04 |
|  | 2W_180° Peeling Force |  | N | 0.05 | 0.05 | 0.05 | 0.05 |
|  | Unevenness Difference After Peeling |  | nm | 200 | 150 | 150 | 200 |
|  | Gloss After Coating |  | — | 140 | 140 | 140 | 120 |
|  | Gloss After Peeling |  | — | 150 | 145 | 150 | 120 |
|  | Δ Gloss |  | — | 10 | 5 | 10 | 0 |
| Molded Product Evaluation | Chemical Resistance |  | — | A | A | A | A |
|  | Scratch Resistance |  | — | A | A | A | A |
|  | Adhesion |  | number/100 squares | A | A | A | A |
|  | Image Clearness |  | 20° Reflection Haze | 5 | 3 | 3 | 80 |

|  |  |  |  | Example 5 | Example 6 | Example 7 |
|---|---|---|---|---|---|---|
| Protective Film | Base Material | Kind | — | polyester | copolymerized polyester | heat-resistant polyester |
|  |  | Thickness | μm | 38 | 38 | 25 |
|  | Release Layer | Kind | — | dimethylsiloxane | dimethylsiloxane | dimethylsiloxane |
|  | Physical Property | Surface Roughness/Ra | nm | 25 | 25 | 10 |
|  |  | Dry Thickness of Coating Film Layer | nm | 40 | 40 | 40 |
|  |  | Present amount of nitrogen atoms | atm % | Not detected | Not detected | Not detected |
|  |  | tanδ Peak Temperature | ° C. | 95 | 75 | 130 |
| Thermosetting Resin Layer | Organometallic Complex | Metal Species | — | aluminum | boron | boron |
|  |  | Ligand First Component | — | acetylacetone | acetylacetone | acetylacetone |
|  |  | Ligand Second Component | — | benzylacetone | benzylacetone | benzylacetone |
|  | Physical Property | Thickness | μm | 15 | 15 | 15 |
| Thermoplastic Resin Layer | Component | Kind | — | copolymerized polyester | copolymerized polyester | copolymerized polyester |
|  | Filler | Kind | — | titanium oxide | aggregated silica | — |
|  |  | Added Amount | ppm | 100,000 | 100 | — |
|  |  | Thickness | μm | 50 | 50 | 75 |
|  | Surface Treatment (kind) |  | — | crosslinked acrylic | crosslinked acrylic | crosslinked acrylic |

TABLE 1-continued

|  |  |  |  |  |  |  |
|---|---|---|---|---|---|---|
|  | Physical | Thickness | nm | 30 | 30 | 30 |
|  | Property | Surface Roughness/Ra | nm | 1,000 | 35 | 5 |
|  |  | Total Light Transmittance | % | 8 | 88 | 90 |
| Colored Layer | Coating Material | Kind | — | titanium oxide | — | — |
|  | Vapor Deposition | Metal | — | — | indium | indium |
| Other Layer | Backer Layer | Thickness | μm | — | 250 | 250 |
|  | Adhesive Layer | Thickness | μm | 20 | — | — |
| Laminated Body Evaluation | 180° Peeling Force | | N | 0.04 | 0.04 | 0.04 |
|  | 2W_180° Peeling Force | | N | 0.05 | 0.05 | 0.05 |
|  | Unevenness Difference After Peeling | | nm | 200 | 200 | 30 |
|  | Gloss After Coating | | — | 120 | 130 | 150 |
|  | Gloss After Peeling | | — | 120 | 130 | 160 |
|  | Δ Gloss | | — | 0 | 0 | 10 |
| Molded Product Evaluation | Chemical Resistance | | — | A | A | A |
|  | Scratch Resistance | | — | A | A | A |
|  | Adhesion | | number/100 squares | A | A | A |
|  | Image Clearness | 20° Reflection Haze |  | 80 | 5 | 2 |

TABLE 2

|  |  |  |  | Comparative Example 1 | Comparative Example 2 | Comparative Example 3 |
|---|---|---|---|---|---|---|
| Protective Film | Base Material | Kind | — | polyester | polyester | polyester |
|  |  | Thickness | μm | 38 | 38 | 38 |
|  | Release Layer | Kind | — | aminoalkyd resin | dimethylsiloxane | fluororesin |
|  | Physical Property | Surface Roughness/Ra | nm | 25 | 35 | 35 |
|  |  | Dry Thickness of Coating Film Layer | nm | 40 | 40 | 100 |
|  |  | Present amount of nitrogen atoms | atm % | 9.7 | Not detected | Not detected |
|  |  | tanδ Peak Temperature | ° C. | 95 | 95 | 95 |
| Thermosetting Resin Layer | Organometallic Complex | Metal Species | — | boron | boron | boron |
|  |  | Ligand First Component | — | acetylacetone | acetylacetone | acetylacetone |
|  |  | Ligand Second Component | — | benzylacetone | benzylacetone | benzylacetone |
|  | Physical Property | Thickness | μm | 15 | 15 | 15 |
| Thermoplastic Resin Layer | Component | Kind | — | copolymerized polyester | copolymerized polyester | copolymerized polyester |
|  | Filler | Kind | — | aggregated silica | aggregated silica | aggregated silica |
|  |  | Added Amount | ppm | 100 | 100 | 100 |
|  |  | Thickness | μm | 50 | 50 | 50 |
|  | Surface Treatment (kind) | | — | crosslinked acrylic | crosslinked acrylic | crosslinked acrylic |
|  | Physical | Thickness | nm | 30 | 30 | 30 |
|  | Property | Surface Roughness/Ra | nm | 35 | 35 | 35 |
|  |  | Total Light Transmittance | % | 87 | 88 | 84 |
| Colored Layer | Coating Material | Kind | — | — | — | — |
|  | Vapor Deposition | Metal | — | indium | indium | indium |
| Other Layer | Backer Layer | Thickness | μm | 250 | 250 | 250 |
|  | Adhesive Layer | Thickness | μm | — | — | — |
| Laminated Body Evaluation | 180° Peeling Force | | N | 0.04 | 0.04 | 0.04 |
|  | 2W_180° Peeling Force | | N | 0.16 | 0.05 | 0.05 |
|  | Unevenness Difference After Peeling | | nm | 350 | 350 | 350 |
|  | Gloss After Coating | | — | 140 | 140 | 140 |
|  | Gloss After Peeling | | — | 140 | 120 | 120 |
|  | Δ Gloss | | — | 0 | −20 | −20 |
| Molded Product | Chemical Resistance | | — | A | A | A |
|  | Scratch Resistance | | — | A | A | A |

TABLE 2-continued

| Evaluation | | Adhesion | number/100 squares | A | A | A |
|---|---|---|---|---|---|---|
| | | Image Clearness | 20° Reflection Haze | 15 | 12 | 12 |

| | | | | Comparative Example 4 | Comparative Example 5 | Comparative Example 6 |
|---|---|---|---|---|---|---|
| Protective Film | Base Material | Kind | — | polyolefin | polyester | polyester |
| | | Thickness | μm | 38 | 38 | 38 |
| | Release Layer | Kind | — | — | dimethylsiloxane | aminoalkyd resin |
| | Physical Property | Surface Roughness/Ra | nm | 40 | 25 | 25 |
| | | Dry Thickness of Coating Film Layer | nm | — | 40 | 40 |
| | | Present amount of nitrogen atoms | atm % | Not detected | Not detected | 9.7 |
| | | tanδ Peak Temperature | °C. | 55 | 95 | 95 |
| Thermosetting Resin Layer | Organometallic Complex | Metal Species | — | boron | aluminum | boron |
| | | Ligand First Component | — | acetylacetone | acetylacetone | acetylacetone |
| | | Ligand Second Component | — | benzylacetone | — | benzylacetone |
| | Physical Property | Thickness | μm | 15 | 15 | 15 |
| Thermoplastic Resin Layer | Component | Kind | — | copolymerized polyester | copolymerized polyester | copolymerized polyester |
| | Filler | Kind | — | aggregated silica | aggregated silica | titanium oxide |
| | | Added Amount | ppm | 100 | 100 | 100,000 |
| | | Thickness | μm | 50 | 50 | 50 |
| | | Surface Treatment (kind) | — | crosslinked acrylic | crosslinked acrylic | crosslinked acrylic |
| | Physical Property | Thickness | nm | 30 | 30 | 30 |
| | | Surface Roughness/Ra | nm | 35 | 35 | 1,000 |
| | | Total Light Transmittance | % | 78 | 88 | 8 |
| Colored Layer | Coating Material | Kind | — | — | — | titanium oxide |
| | Vapor Deposition | Metal | — | indium | indium | — |
| Other Layer | Backer Layer | Thickness | μm | 250 | 250 | 250 |
| | Adhesive Layer | Thickness | μm | — | — | — |
| Laminated Body Evaluation | | 180° Peeling Force | N | 0.03 | 0.04 | 0.04 |
| | | 2W_180° Peeling Force | N | 0.04 | 0.05 | 0.16 |
| | | Unevenness Difference After Peeling | nm | 800 | 350 | 350 |
| | | Gloss After Coating | — | 140 | 140 | 120 |
| | | Gloss After Peeling | — | 90 | 120 | 115 |
| | | Δ Gloss | — | −50 | −20 | −5 |
| Molded Product Evaluation | | Chemical Resistance | — | A | B | A |
| | | Scratch Resistance | — | A | C | A |
| | | Adhesion | number/100 squares | A | A | A |
| | | Image Clearness | 20° Reflection Haze | 25 | 25 | 90 |

In Tables 1 and 2, "-" means that the corresponding component is not contained. Abbreviations in Tables 1 and 2 are as follows.

Polyester resin: weight average molecular weight; 40,000, composition; polyethylene terephthalate Copolymerized polyester: weight average molecular weight; 55,000, composition; blend resin of polyethylene terephthalate and isophthalic acid-copolymerized polyethylene terephthalate and polybutylene terephthalate Heat-resistant polyester: weight average molecular weight; 19,000, composition; polyethylene-2,6-naphthalate Polyolefin: weight average molecular weight; 300,000, composition; polypropylene Dimethylsiloxane: manufactured by Teijin Film Solutions Limited, product name; PURER A31

Aminoalkyd resin: melamine resin, manufactured by Hitachi Chemical Company, Ltd., product name; TESFINE 303

Fluororesin: manufactured by AGC Inc., product name; AFLEX

Copolymerized acrylic: manufactured by Kuraray Co., Ltd., product name; PARAPURE Aggregated silica: average particle diameter 1.6 μm Crosslinked acrylic, weight average molecular weight; 220,000

From the results shown in Tables 1 and 2, the laminated body according to the invention and the integrally molded product obtained by integrally molding the obtained laminated body and the molded member are superior in image clearness compared to the laminated body of Comparative Examples and the integrally molded product obtained by integrally molding the obtained laminated body and the molded member.

The disclosure of Japanese Patent Application No. 2019-043172 filed on Mar. 8, 2019 is incorporated herein by reference in its entirety.

All documents, patent applications, and technical standards described in this specification are incorporated herein by reference to the same extent as in a case in which each document, patent application, and technical standard is specifically and individually indicated to be incorporated by reference.

The invention claimed is:

1. A laminated body in which a thermoplastic resin layer, a thermosetting resin layer, and a protective film are layered one on another in this order, wherein:
   the thermosetting resin layer contains two or more kinds of organometallic complex,
   a surface of the protective film at a side contacting the thermosetting resin layer has a surface roughness Ra of 30 nm or less, and
   an amount of nitrogen atoms present at the surface of the protective film at the side of the thermosetting resin layer is less than 1 atm %.

2. The laminated body according to claim 1, wherein the two or more kinds of organometallic complex include an acetylacetone complex and a benzylacetone complex.

3. The laminated body according to claim 1, wherein at least one metal of the two or more kinds of organometallic complex is boron.

4. The laminated body according to claim 1, wherein the thermosetting resin layer contains two kinds of organometallic complex.

5. The laminated body according to claim 1, further comprising a colored layer between the thermoplastic resin layer and the thermosetting resin layer.

6. The laminated body according to claim 5, wherein the colored layer contains a colored material in which an amount of nitrogen atoms is 1 atm % or less.

7. The laminated body according to claim 1, wherein the protective film has a tan δ peak temperature of 70° C. or more.

8. A method of producing a metal member, the method comprising:
   subjecting the laminated body according to claim 1 and a heated steel plate to thermocompression bonding and press molding; and
   curing the thermosetting resin layer.

9. A method of producing a resin member, the method comprising:
   inserting the laminated body according to claim 1 into a mold;
   after inserting the laminated body into the mold, injection molding a resin in a molten state to perform in-mold molding; and
   curing the thermosetting resin layer during a period of time from after the insertion to completion of the in-mold molding.

10. A method of producing a resin member, the method comprising:
    vacuum heat molding the laminated body according to claim 1; and
    curing the thermosetting resin layer during a period of time from before the vacuum heat molding to completion of the vacuum heat molding.

* * * * *